United States Patent
Beulque (10) Patent No.: US 7,714,230 B2
(45) Date of Patent: May 11, 2010

(54) LAMINATED BUS BARS AND METHODS OF MANUFACTURE THEREOF

(75) Inventor: Marc Beulque, Waregem (BE)

(73) Assignee: World Properties, Inc., Lincolnwood, IL (US)

( * ) Notice: Subject to any disclaimer, the term of this patent is extended or adjusted under 35 U.S.C. 154(b) by 0 days.

(21) Appl. No.: 12/031,048

(22) Filed: Feb. 14, 2008

(65) Prior Publication Data

US 2008/0196924 A1    Aug. 21, 2008

Related U.S. Application Data

(60) Provisional application No. 60/890,205, filed on Feb. 16, 2007.

(51) Int. Cl.
 *H01B 7/08* (2006.01)
(52) U.S. Cl. .................................. 174/117 A
(58) Field of Classification Search ............. 174/117 F, 174/117 FF, 117 A
 See application file for complete search history.

(56) References Cited

U.S. PATENT DOCUMENTS

| | | | |
|---|---|---|---|
| 3,396,230 A * | 8/1968 | Crimmins | 174/72 B |
| 3,844,030 A | 10/1974 | Wilkinson | |
| 3,893,233 A * | 7/1975 | Glover | 29/838 |
| 4,584,768 A | 4/1986 | Tosti | |
| 5,172,304 A * | 12/1992 | Ozawa et al. | 361/763 |
| 5,212,279 A | 5/1993 | Nomura et al. | |
| 6,180,885 B1 | 1/2001 | Goldman et al. | |
| 6,444,911 B2 | 9/2002 | Maruyama et al. | |
| 6,852,415 B2 | 2/2005 | Rocks et al. | |
| 7,037,392 B2 | 5/2006 | Baumann et al. | |
| 2005/0077075 A1 | 4/2005 | Wang et al. | |
| 2006/0053620 A1 | 3/2006 | Wang et al. | |

FOREIGN PATENT DOCUMENTS

WO    2008/101067 A1    8/2008

* cited by examiner

*Primary Examiner*—Chau N Nguyen
(74) *Attorney, Agent, or Firm*—Cantor Colburn LLP (57) ABSTRACT

A method of assembling a multilayer bus bar assembly includes coating a dielectric layer with a molten reactive hot-melt adhesive, placing the dielectric layer between first and second subassemblies, wherein the first and second subassemblies comprise a conductive element, adhering the molten reactive hot-melt adhesive to the subassemblies by applying a pressure of at least about one bar to the multilayer bus bar assembly for at least about one minute prior to the adhesive cooling to room temperature to provide a bonding strength between the dielectric material and a selected one of the first and second subassemblies of at least 1500 Newtons on a 25 millimeter by 25 millimeter sample when tested in accordance with ASTM D-1062.

20 Claims, 6 Drawing Sheets

LAMINATED BUS BARS AND METHODS OF MANUFACTURE THEREOF

CROSS-REFERENCE TO RELATED APPLICATIONS

This application claims the benefit of U.S. Provisional Application Ser. No. 60/890,205 filed Feb. 16, 2007, which is incorporated herein by reference in its entirety.

BACKGROUND

This disclosure relates to laminated bus bars, and methods of manufacture thereof.

The electrical power distribution system is an important component in a wide variety of applications such as computer systems, telecommunication equipment, industrial process control, automation cabinets, and the like. Power distribution bus bar systems are also key components of higher voltage applications in electric traction modules and propulsion systems for transportation, such as trains, subways, light rail vehicles, electric/hybrid cars, and the like. For such higher voltage applications, the high power bus bars are devices consisting of relatively thick (0.5 millimeter (mm) to 5 mm) conductive layers and are used to deliver electrical power at low inductance to high current devices, like the traction motors.

The high power bus bars are typically three dimensional, multilayered, and laminated. Current high power bus bars are assembled by one of four methods. The first method employs the use of thermoplastic film adhesives. In this method, two sheets of insulation film are cut to the shape of a pre-tooled dielectric layer and placed on either side of the dielectric between two or more subassemblies to form a multilayer bus bar. The bus bar is then placed in a specially designed fixture in a heated press. The entire multilayer bus bar is then heated in the press to soften the thermoplastic adhesive layers, and is held at this temperature and pressure until the bond is complete. Finally, the bus bar is removed from the press and cooled to room temperature before further handling. This process can be both time consuming (requiring between 30 and 45 minutes) and energy intensive.

A second method of high-power bus bar assembly uses a thermoset "B-staged" bondply, wherein two sheets of bondply are cut to the shape of a pre-tooled dielectric layer and placed on either side of the dielectric between two or more subassemblies to form a multilayer bus bar. The bus bar is then placed in a specially designed fixture in a heated press. The entire multilayer bus bar is heated in the press to cure the thermoset prepreg, and is held at this temperature until the cure is complete. The bus bar is then removed from the press and must cool to near room temperature before further handling. This process is also both time consuming (requiring between 1 and 2 hours) and energy intensive.

Another current method of assembling high-power bus bars uses a two component liquid epoxy or other like liquid thermoset adhesive. In this method, either the surfaces of the bus bar subassemblies or the dielectric material are coated with the liquid. This step is typically done through hand brushing of the liquid epoxy onto the surface of the subassembly and/or the dielectric. A common drawback of this method is that it can be difficult to control the thickness of the adhesive layer. Another drawback is the method is an untidy process, which requires additional labor.

Figure 1:
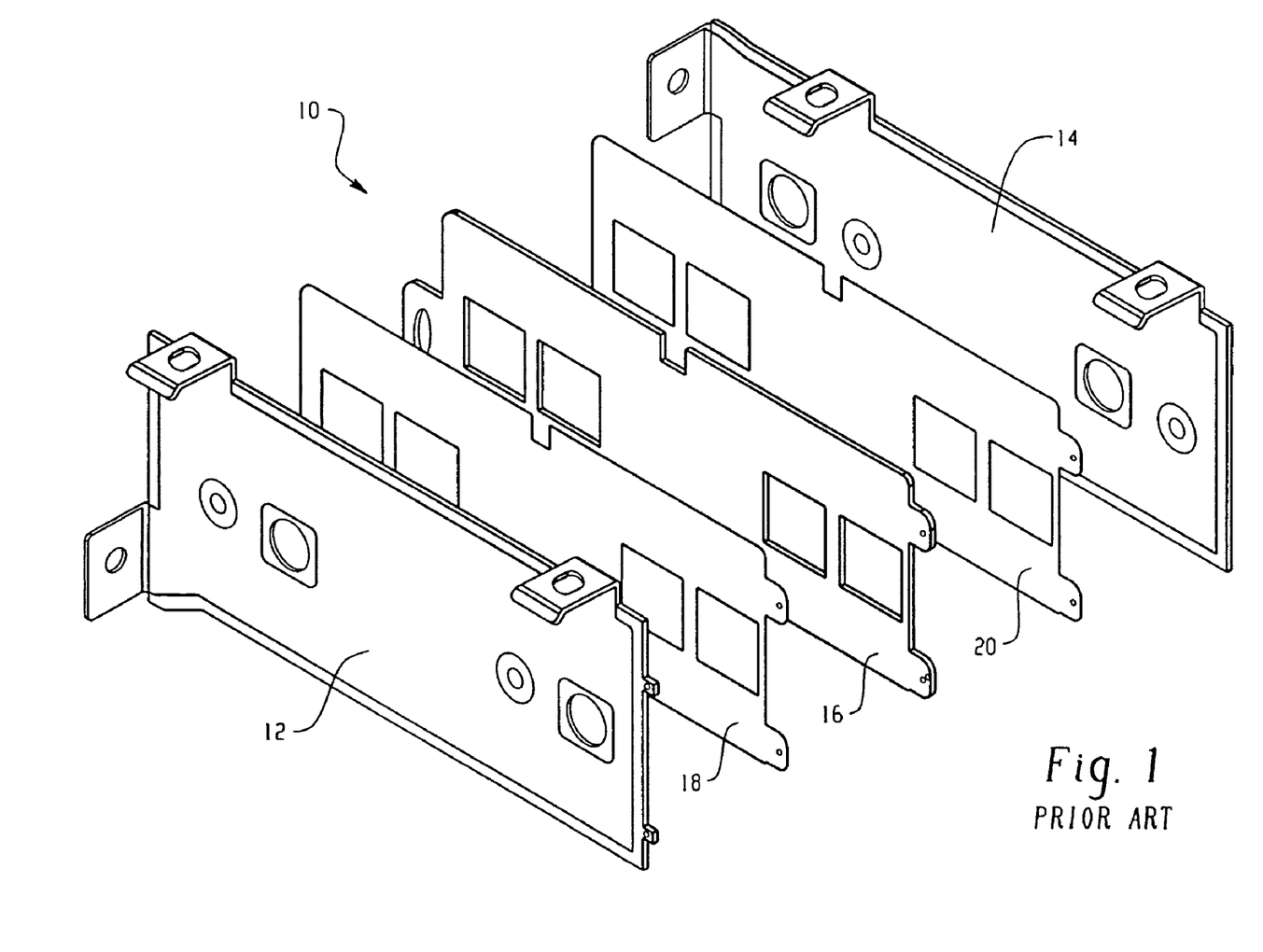
FIG. 1 is a schematic diagram showing an exploded view of a prior art bus bar.

An example of a bus bar produced by the above described methods is shown in FIG. 1. The bus bar 10 comprises a first subassembly 12 and a second subassembly 14. Each subassembly is disposed about a dielectric insulating board 16. An adhesive insulation layer 18, 20 is disposed between each subassembly 12, 14 and the dielectric board 16. The entire assembly is put in a press where it is heated, thereby allowing the adhesive insulation layer to form a bond between the subassemblies and the dielectric board.

In the final of the four current methods of assembling high-power bus bars, mechanical fasteners, such as nuts, bolts, rivets and the like are used to secure the subassemblies. This method requires additional hardware as well as additional labor.

There accordingly remains a need in the art for improved high-power multilayer bus bars and methods of assembling the bus bars.

BRIEF SUMMARY

Disclosed herein is a laminated bus bar assembly, comprising first and second subassemblies, each one of the subassemblies comprising a conductive element, a dielectric layer intermediate the first and second subassemblies, and a reactive hot-melt adhesive adapted to bond the first and second subassemblies to the dielectric layer, wherein the reactive hot-melt adhesive has a cleavage strength between the dielectric layer and a selected one of the first and second subassemblies of at least 1500 Newtons when tested in accordance with ASTM D-1062 with a 25 mm×25 mm sample.

In another embodiment, a method of assembling a multilayer bus bar assembly includes coating a dielectric layer with a molten reactive hot-melt adhesive, placing a the dielectric layer between first and second subassemblies, wherein the first and second subassemblies comprise a conductive element, adhering the molten reactive hot-melt adhesive to the subassemblies by applying a pressure of at least about one bar to the sandwich for at least about one minute prior to the adhesive cooling to room temperature. Upon complete cure of the adhesive, for example after storage at ambient temperature for 1 to 4 days, the multilayer bus bar assembly has a cleavage strength between the dielectric material and a selected one of the first and second subassemblies of at least 1500 Newtons when tested in accordance with ASTM D-1062 with a 25 mm×25 mm sample.

DETAILED DESCRIPTION

The inventors hereof have found that a reactive hot-melt adhesive can be used to assemble a high-power, multilayer bus bar. The high-power multilayer bus bar assembled using the reactive hot-melt adhesive can significantly reduce bus bar assembly time, while improving the physical properties and environmental resistance of the bus bar assembly. In one embodiment, the disclosed bus bar has a higher bonding strength, lower assembly time, improved electrical performance, and greater drop test performance over current bus bars assembled by the methods described above. The bus bars as disclosed herein are particularly suitable for use in high power applications, such as electric traction modules. Electric traction modules and propulsion systems can be found in transportation means, such as locomotives, trams, subways/metros, trolleys, busses, people movers, and the like.

In one embodiment, a bus bar comprises a dielectric layer intermediate two subassemblies. The dielectric layer comprises a solid component comprised of dielectric material, which can be cut and shaped to any suitable size and shape for a given application. Suitable dielectric materials include flame-resistant 4 (FR4) epoxy-woven glass laminate, non-woven reinforced polyethylene terephthalate (PET) composite, and other like electrically insulating materials, depending on the intended application of the laminated bus bar assembly. Moreover, because the bus bar comprises reactive hot-melt adhesive, rather than thermal adhesives, lower temperature dielectric materials can be used, such as polycarbonate (PC) or polypropylene (PP). The dielectric material can have a thickness of about 1 millimeter (mm) to about 10 mm, and can be die cut to mirror the features of the subassemblies. For example, the dielectric layer can be cut to have tabs, mounting bolt holes, cutouts, access holes, and the like, so that when combined with the subassemblies the like features are aligned.

A reactive hot-melt adhesive advantageously bonds the dielectric material to the subassemblies to form the bus bar assembly. The reactive hot-melt adhesive is a thermoplastic material that is applied to the dielectric material in the molten state as a viscous liquid. When the reactive hot-melt adhesive cools, a solid adhesive layer is formed on the surface of the dielectric material, which is capable of cross-linking at room temperature and forming a bond, i.e., a cleavage strength between the dielectric layer and the subassemblies of at least about 1500 Newtons on a 25 mm×25 mm sample when tested in accordance with American Society of Testing and Materials (ASTM) D-1062. Reactive hot-melt adhesives suitable for the bus bars include, without limitation, room temperature moisture activated cross-linking adhesives.

A variety of different types of reactive hot melt adhesives can be used. One exemplary type of moisture activated reactive hot-melt adhesives is based on urethane chemistry and is known as polyurethane reactive hot-melt adhesives (PURHM). The room temperature cross-linking reaction involves the moisture activated reaction of excess isocyanate groups in the adhesive layer. Suitable manufacturers of PURHM adhesives include 3M (JetWeld®), Reichhold (Ever-Lock®), Franklin (ReacTITE®), HIPURformer®), Rohm & Haas (Mor-Melt®), Kleiberit, National Starch, Seaco, Sika, Degussa, and Jowat. In an exemplary embodiment, a Kleiberit reactive adhesive, such as 708.1, is used.

Another group of moisture activated reactive hot-melt adhesives are known as amorphous poly-alpha-olefin (APAO) reactive hot melt adhesives. For these types of adhesives, the moisture activation reaction is free of isocyanate groups. The absence of isocyanate groups makes these adhesives less hazardous during use. Exemplary manufacturers of APAO adhesives include Jowat AG and Degussa GmbH. In another exemplary embodiment, a Jowat-Reaktant reactive adhesive, such as 637.00, is used.

Regardless of the chemistry base, each reactive hot-melt adhesive advantageously permits lamination of the bus bar in less than or equal to about 5 minutes at a pressure of about 1 bar to about 10 bar before the adhesive cools. The reactive hot-melt adhesive is then permitted to cool, wherein it reacts at room temperature to develop high-temperature resistance up to about 150 degrees Celsius (° C.) for short duration and about 105° C. for longer durations.

The dielectric layer is disposed intermediate two or more subassemblies to form a bus bar assembly. Each subassembly comprises a conductive element, which may optionally be disposed between two insulating layers. The conductive element can be formed of any electrically conductive material, such as, copper, tin-plated copper, aluminum, and the like. Suitable insulating layers include, polyethylene terephthalate (PET), PET/polyvinyl fluoride (PVF), polyethylene naphthalate (PEN), polyimide (PI), and the like, and are adhesively bonded to the conductive element. In an exemplary embodiment, the conductive element thickness can be from about 0.5 mm to about 5 mm. The insulating layers can have a thickness of about 75 micrometers (μm) to about 500 μm. Like the dielectric layer, the insulating layers can be die cut. The conductive elements can be stamped, machined, water-jetted, laser cut, or the like. All three components are then formed into the subassemblies, wherein the subassemblies can have a variety of features, such as tabs, mounting bolt holes, cutouts, access holes, and the like, suitable for the intended application.

Figure 2:
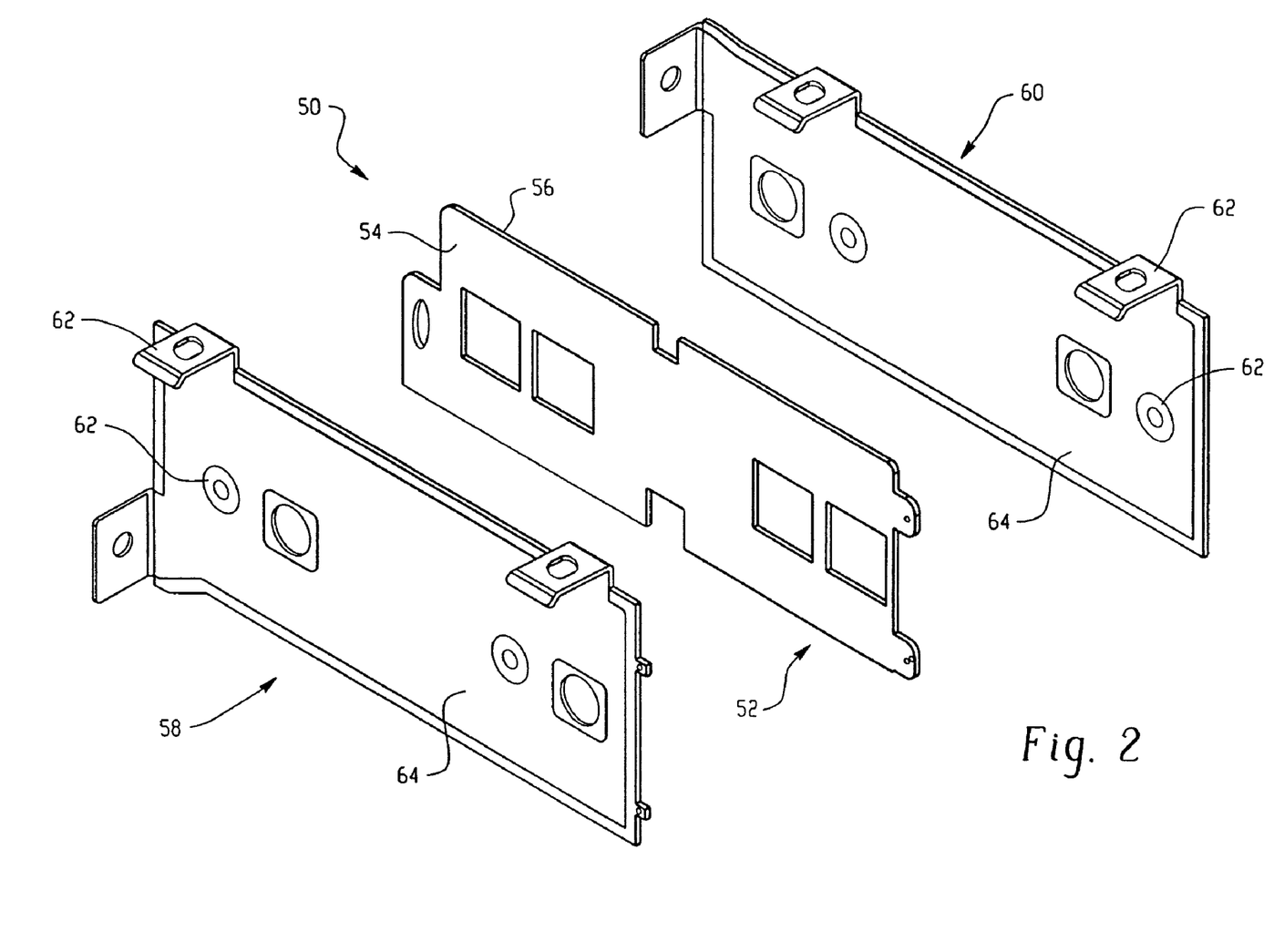
FIG. 2 is a schematic diagram showing an exploded view of a reactive hot-melt adhesive bonded bus bar as described herein.
Figure 3:
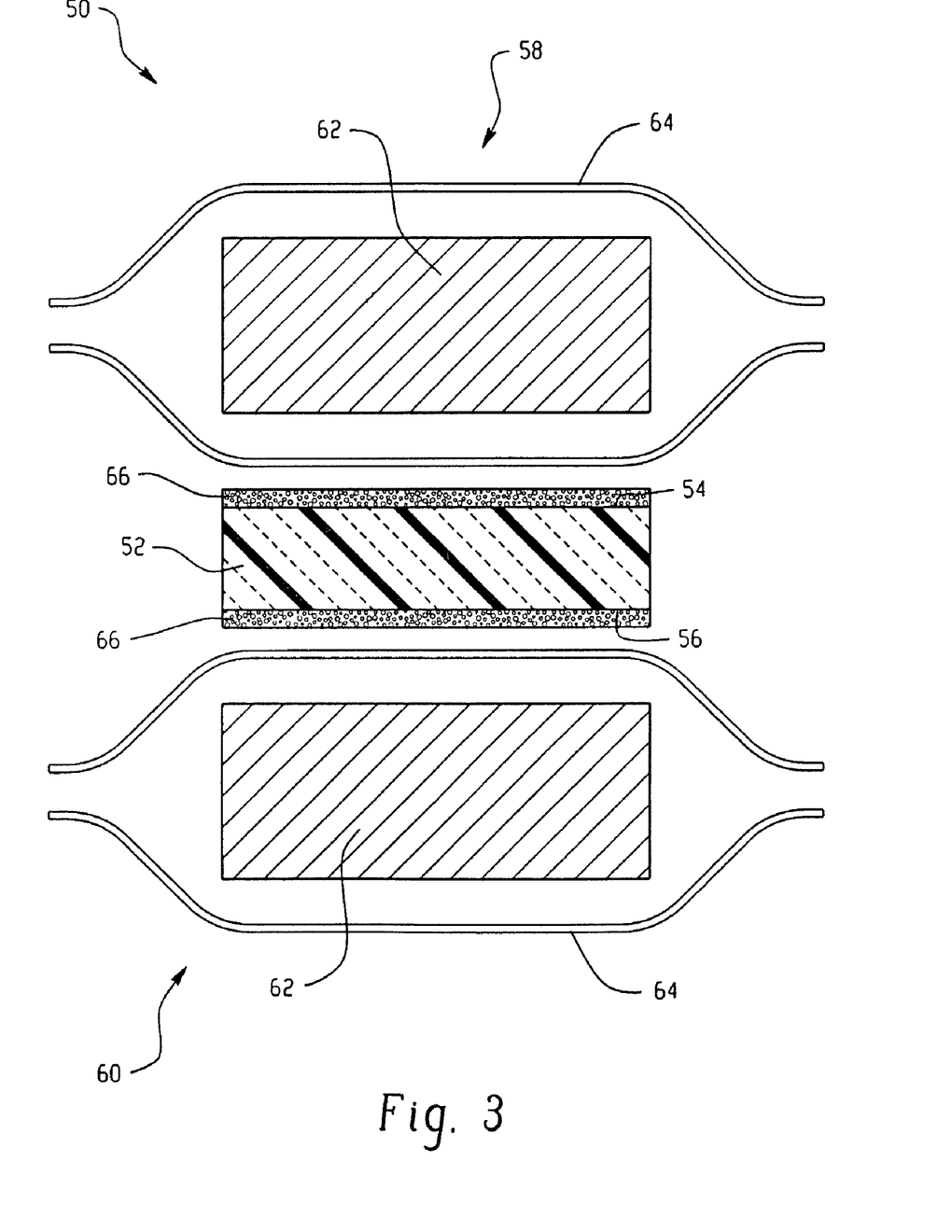
FIG. 3 is a cross-sectional view of a reactive hot-melt adhesive bonded bus bar.

FIG. 2 illustrates an exemplary embodiment of a reactive hot melt adhesive bonded bus bar 50, wherein the layers of the bus bar 50 are exploded to better show the individual components. A dielectric layer 52, having top and bottom surfaces 54 and 56, is sandwiched between first and second subassemblies 58 and 60. The subassemblies comprise conductive elements 62 and are coated on the surface with an insulating layer 64. In another embodiment, the subassemblies are bare metal conductors having no insulation, such as used in "stacked" bus bars. The first and second subassemblies are bonded to the dielectric material 52 by a molten reactive hot-melt adhesive 66 (not shown), which is coated on the top and bottom surfaces 54 and 56 of the dielectric layer 52. As will be described in greater detail below, the bus bar assembly is pressed together and laminated in a matter of minutes, without the need of heat or an additional adhesive insulation component. In FIG. 3, a cross-sectional view of the bus bar 50 is shown to more clearly illustrate the individual layers of the bus bar assembly, including the reactive hot-melt adhesive 66.

A method of assembling a laminated bus bar includes coating a dielectric layer with a reactive hot-melt adhesive. In one embodiment, the dielectric layer can be preheated to a temperature of about 50 degrees Celsius (° C.) to about 60° C. depending on the reactive hot-melt adhesive to be used. The reactive hot-melt adhesive is applied to the dielectric layer in molten form. As used herein, the term "molten" is intended to generally mean a viscosity low enough that the adhesive can form a coating on the dielectric layer. Moreover, the coating method can further include first heating the reactive hot-melt adhesive from a solid form to a molten liquid form. The molten reactive hot-melt adhesive can be applied to the dielectric layer by any suitable manner known to those skilled in the art, such as roll coating, and the like. In an exemplary embodiment, the reactive hot-melt adhesive is roll coated onto the dielectric layer. A commercially available hot-melt adhesive roll coating machine can be used to coat the dielectric layer, such as those manufactured by Barberan, Hymmen, Hardo, or other suitable manufacturers. In an exemplary embodiment, the PUR® hot-melt roller coating machines produced by Hardo-GmbH is used.

Figure 4:
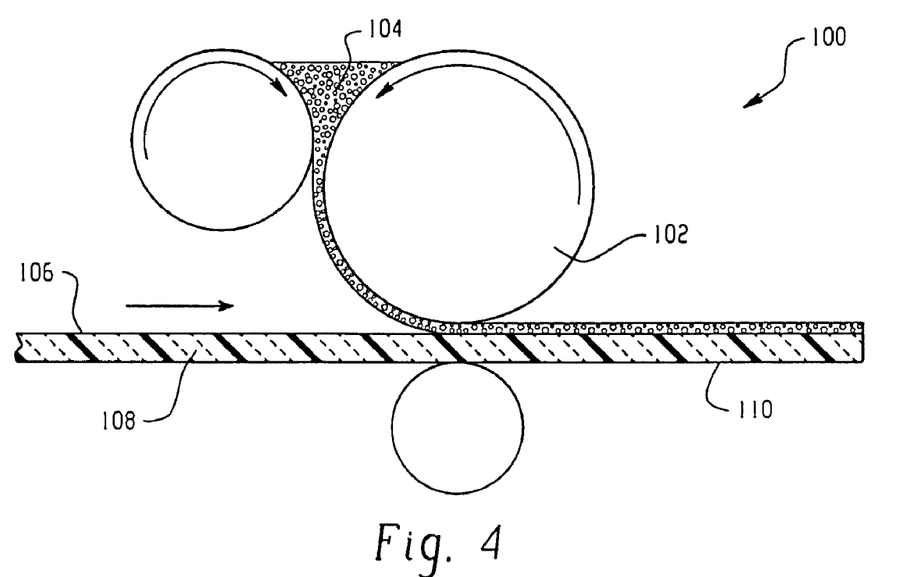
FIG. 4 is a schematic diagram of a single-sided hot-melt adhesive roll coating machine.
Figure 5:
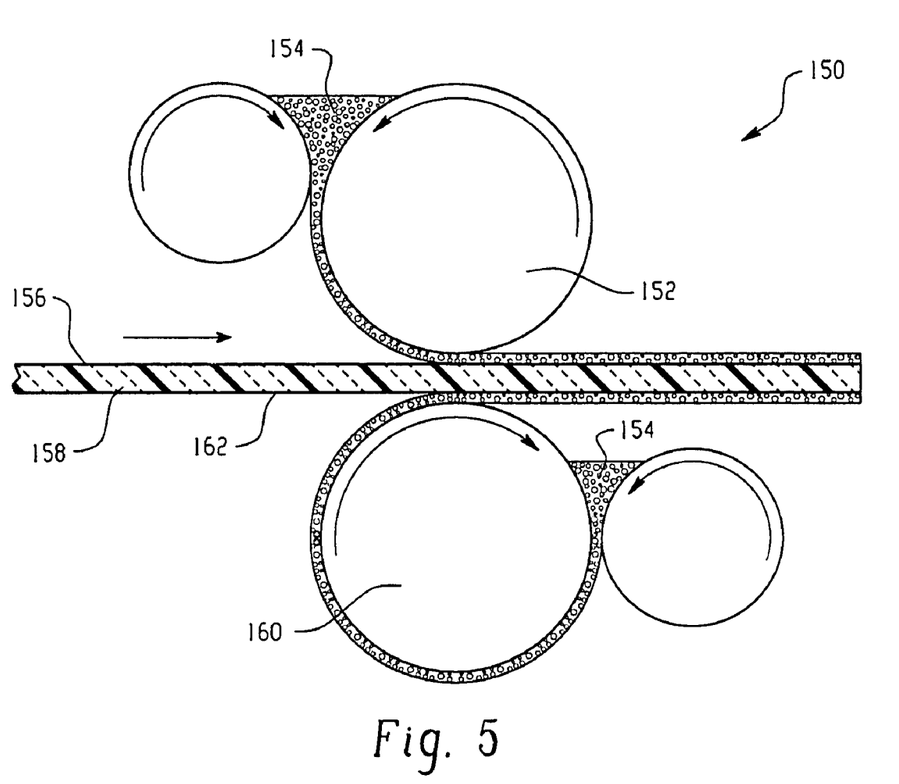
FIG. 5 is a schematic diagram of a double-sided hot-melt adhesive roll coating machine.

FIG. 4 illustrates one embodiment of a hot-melt roll coating machine 100, wherein a coating roll 102 is configured to coat the molten adhesive 104 to a top surface 106 of the dielectric layer 108. In this method, the top surface 104 of the dielectric layer 108 makes a pass through the roll coating machine 100 and is coated. The dielectric layer 108 is then turned over and makes a second pass through the roll coating machine 100, wherein a bottom surface 110 is coated with the molten adhesive 104 by the coating roll 102. A release layer, such as silicon-coated paper or the like, can be applied to an exposed surface of the reactive hot-melt adhesive, in this case the coated top surface 104 to protect the surface from contamination or from adhering to the conveyor belt of the roll coating machine 100 during the dielectric layer's second pass through the machine. The release layer is peeled away from the adhesive coated top surface before the dielectric layer is sandwiched intermediate the first and second subassemblies. In another embodiment, both the top and bottom surfaces of the dielectric layer can be coated simultaneously, as illustrated in FIG. 5. In this manner, the roll coating machine 150 can have two coating rolls. The first coating roll 152 can coat the top surface 156 of the dielectric layer 158 with molten adhesive 154, while a second coating roll 160 can simultaneously coat the bottom surface 162 of the dielectric layer 158. With this method, only one pass of the dielectric layer through the roll coating machine is required. Simultaneously coating both surfaces of the dielectric layer can be particularly beneficial for dielectric materials having a thickness of greater than or equal to about 6 mm, and can further reduce production time and costs for the bus bars as described herein.

After the molten reactive hot-melt adhesive is coated on each side of the dielectric layer, it is placed between first and second subassemblies to be laminated together. The molten reactive hot-melt adhesive is then adhered to the subassemblies by applying pressure of at least about 1 bar to the assembly for at least about 1 minute prior to the adhesive cooling to room temperature. In one method, the multilayer bus bar assembly is placed in a fixture specially designed to hold the bus bar within an unheated pneumatic platen press. The multilayer bus bar assembly is then subjected to a pressure of about 1 bar to about 10 bars for a period of about 1 minute to about 5 minutes. The laminated bus bar assembly is removed from the press and the process may be repeated until the desired number of layers is produced for a multilayer bus bar. Depending upon the particular hot-melt adhesive used, cure may be complete after this exemplary lamination cycle. More typically, cure is complete after storage of the multilayer bus bar, for example at ambient temperature for about 1 to 4 days.

Advantageously, the method as disclosed herein requires less time, labor, and energy when compared to existing methods of producing multilayer bus bars. As a result, the cost of producing a multilayer bus bar comprising reactive hot-melt adhesive is lower than multilayer bus bars produced by current methods. Furthermore, the multilayer bus bars as produced by the above described method are capable of withstanding the physical, environmental, and electrical conditions demanded by high-power applications. For example, the reactive hot-melt adhesive bus bars have excellent performance in a drop test from a 1.2 meter height. This is improved compared to prior art laminated bus bars.

In addition, the cleavage strength between the dielectric layer and the first or second subassemblies is at least about 1500 N on a 25 mm×25 mm sample when tested in accordance with ASTM D11062.

The hot-melt adhesive bus bars can have high cleavage strength values, in particular high initial bond strength that decreases to an acceptable value after aging.

The reactive hot-melt adhesive bus bars also have improved electrical performance in partial discharge testing; compared to prior art bus bars manufactured using a second lamination process. Breakdown voltage performance is comparable to prior art laminated bus bars.

The reactive hot-melt adhesive bus bars also have improved thermal aging performance for example at 55° C. at 95% relative humidity (RH), compared to prior art bus bars using a second lamination process. Improved thermal cycling performance, such as −40° C.+105° C. cycling is also observed; relative to prior art bus bars manufactured using a second lamination process.

In another advantageous feature, use of a reactive hot-melt adhesive does not adversely affect the flame retardance of the bus bar in combination with an insulator plate. The reactive hot-melt adhesive bus bars can have a UL-94 rating of V0.

The following examples, which are meant to be exemplary, not limiting, illustrate laminated bus bars and methods of manufacturing the various embodiments of the laminated bus bars described herein. In some examples, the laminated bus bars comprising reactive hot-melt adhesive are compared to bus bars produced using current methods, which are generally referred to herein as "second lamination" methods and "second lamination" bus bars.

EXAMPLE 1

An evaluation of the adhesion properties of bus bars made with 3 different types of subassemblies was performed and the results reproduced in Table 1 below. Sample 1 used insulated subassemblies, wherein two bus bar subassemblies, "A" and "B", were insulated with combinations of white opaque polyester insulation and insulation such as Rogers Induflex® LG4005. To laminate the insulated subassemblies, a layer of 72 grams per square meter (g/m$^2$) of Kleiberit 708.1 polyurethane-based reactive hot-melt adhesive was applied to one side of a pre-tooled 2 mm thick non-woven glass reinforced polyester dielectric layer using a Hardo-GmbH PUR roll coating machine. The coating roll of the machine was set at a temperature of 120° C. and a speed of 5 meters per minute (m/min). The dielectric layer was preheated for 5 minutes to a temperature of 50° C. prior to being coated with the adhesive.

The adhesive coated side of the dielectric layer was then covered with a precut layer of silicone coated release paper and a second layer of the adhesive was applied to the opposite side of the dielectric layer by making a second pass through the roll coating machine. The release paper was then removed and the adhesive coated dielectric layer carefully placed on the surface of subassembly A in an alignment fixture. Subassembly B was positioned on top of the dielectric layer using a fixture and the entire bus bar was placed in an unheated 0.6 meter (m) by 0.6 m pneumatic platen press. The press was closed at a pressure on the bus bar surface of 7 bar for 2 minutes.

The finished bus bar was removed from the press and the cleavage strength was measured in accordance with ASTM D-1062. The results of testing after 5 days of ambient storage; after three weeks of aging at 55° C. and 95% relative humidity (RH); and after 100 thermal cycles from −40° C. to 105° C. are shown in Table 1 below.

Sample 2 used un-insulated subassemblies consisting of bare copper metal. Two bus bar subassemblies, "C" and "D", were laminated with a layer of 72 g/m$^2$ of Kleiberit 708.1 polyurethane-based reactive hot-melt adhesive. The adhesive was first applied to one side of a pre-tooled 2 mm thick non-woven glass reinforced polyester dielectric layer using a Hardo-GmbH PUR roll coating machine. The coating roll of the machine was set at a temperature of 110° C. and a speed of 5 m/min. The dielectric layer was preheated for 5 minutes to a temperature of 50° C. prior to being coated with the adhesive.

The adhesive coated side of the dielectric layer was then covered with a precut layer of silicone coated release paper and a second layer of the adhesive was applied to the opposite side of the dielectric layer by making a second pass through the roll coating machine. The release paper was then removed and the adhesive coated dielectric layer carefully placed on the surface of subassembly C in the alignment fixture. Subassembly D was positioned on top of the dielectric layer using a fixture and the entire bus bar was placed in the unheated 0.6 m by 0.6 m pneumatic platen press. The press was closed at a pressure on the bus bar surface of 7 bar for 2 minutes.

Sample 3 used un-insulated tin-plated subassemblies to create a bus bar with the same method as used for Sample 2.

The finished bus bars were removed from the press and the cleavage strength was measured in accordance with ASTM D-1062. The results of testing after 5 days of ambient storage; after three weeks of aging at 55° C. and 95% relative humidity (RH); and after 100 thermal cycles from −40° C. to 105° C. are shown in Table 1 below:

TABLE 1

ASTM D-1062 Cleavage Test Results on 25 mm × 25 mm samples

| Sample number | After 5 days | After 3 weeks aging 55° C./95% RH | 100 cycles from −40° C./105° C. |
|---|---|---|---|
| Sample 1 | 2481 N | 2123 N | 1609 N |
| Sample 2 | 3178 N | 1926 N | 2270 N |
| Sample 3 | 3036 N | 1909 N | 1956 N |

The upper range of bonding strength for bus bars produced by the "second lamination" method is about 1500 Newtons (N). The minimum acceptable industry value after such environmental testing is 1000 N. The results in Table 1 shows that Samples 1 through 3 exceed both the minimum acceptable industry value, as well as the upper range of cleavage strength for second lamination bus bars.

EXAMPLE 2

Figure 6:
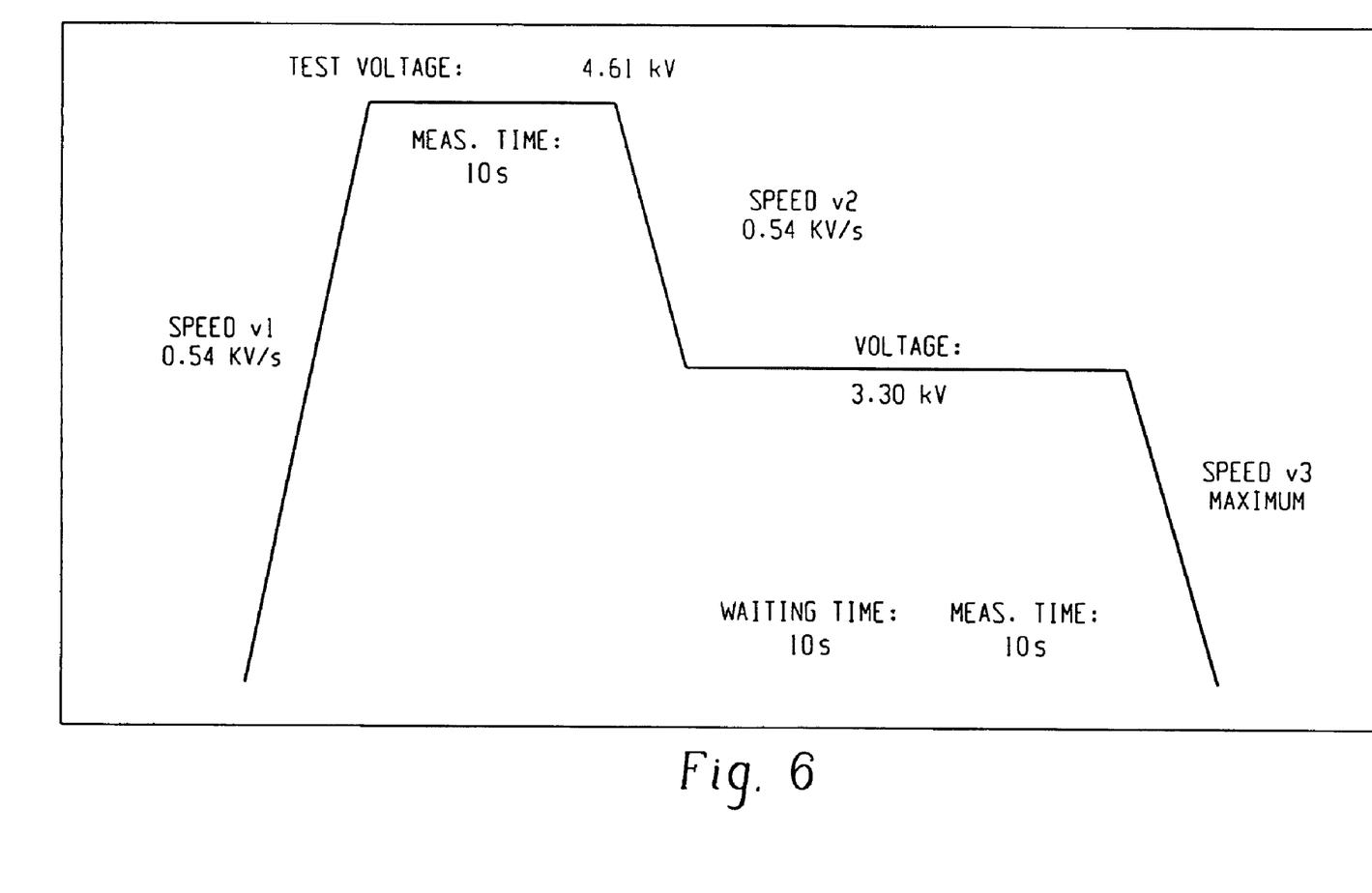
FIG. 6 is a voltage profile graph for a partial discharge test.

An evaluation of the electrical properties of a bus bar comprising reactive hot-melt adhesive compared to a second lamination bus bar was performed and the results reproduced in Table 2 below. The partial discharge test measures the extinction voltage and current impulses (Q) of a bus bar insulation material. It is an important measure of potential defects or inhomogeneous insulation material between conductors, as explained in the standard for partial discharge International Electrotechnical Commission (IEC) 60270. The voltage profile, as shown in FIG. 6, is applied between two adjacent layers of the bus bar under test. The initial test voltage is set too high to stimulate the partial discharges. The voltage is then reduced to determine the extinction voltage and to set the partial discharge (PD)-test voltage. The PD level at the PD-test voltage should be below 10 Pico coulombs (pC), as this is the principle partial discharge that will not produce any defect in the insulation material.

For Sample 4, two bus bar subassemblies, "A" and "B", were insulated with combinations of DuPont Melinex® 339 polyester film and Rogers Induflex® LG4005. The insulated subassemblies were laminated using Kleiberit 708.1 polyurethane-based reactive hot-melt adhesive, wherein a layer of 72 g/m² of adhesive was applied to one side of the pre-tooled 2 mm thick non-woven glass reinforced polyester dielectric layer using a Hardo-GmbH PUR roll coating machine set at 120° C. and a speed of 5 m/min. The dielectric layer was preheated for 5 minutes to a temperature of 50° C. prior to being coated with the adhesive.

The adhesive coated side of the dielectric layer was then covered with a precut layer of silicone coated release paper and a second layer of the adhesive was applied to the opposite side of the dielectric layer by making a second pass through the roll coating machine. The release paper was then removed and the adhesive coated dielectric layer carefully placed on the surface of subassembly A in the alignment fixture. Subassembly B was positioned on top of the dielectric layer using a fixture and the entire bus bar was placed in the unheated 0.6 m by 0.6 m pneumatic platen press. The press was closed at a pressure on the bus bar surface of 7 bar for 2 minutes.

The finished bus bar was removed from the press and the partial discharge was measured at a PD-test voltage of 2.55 kilovolts (kV) giving a PD level of 0.45 pC; considerably less than the maximum allowable PD level of 10 pC.

Comparative sample A was conducted for a bus bar produced using current second lamination technology. For this sample, two bus bar subassemblies, "C" and "D", were insulated with combinations of DuPont Melinex® 339 polyester film and Rogers Induflex® LG4005, identical to those used for the above described novel bus bar. The insulated subassemblies were laminated using second lamination die cut Rogers Induflex LG-4007 thermoplastic Film adhesive, wherein two layers of 160 µm thick thermoplastic film adhesive were pre-tooled to be identical in shape to the pre-tooled 2 mm thick non-woven glass reinforced polyester dielectric layer.

Subassembly C was placed in the alignment fixture, followed by a layer of the pre-tooled adhesive film, the dielectric layer, and lastly the second layer of pre-tooled adhesive film. Subassembly D was positioned on top of the second layer of pre-tooled adhesive film using the fixture and the bus bar was placed in a heated platen press at a temperature of 120° C. The press was closed at a pressure on the bus bar surface of 5 bar for 30 minutes.

The finished second lamination bus bar was removed from the press and the partial discharge was measured, as in Sample 4 above, at the same PD-test voltage of 2.55 kV. Comparative sample A gave a PD level of 0.84 pC. The partial discharge comparison of the second lamination bus bar and the reactive hot-melt adhesive bus bar is shown in Table 2 below:

TABLE 2

| | PD-test voltage (kV) | PD level (pC) | Max. Allowable PD level (pC) |
|---|---|---|---|
| Sample 4 | 2.55 | 0.45 | 10.0 |
| Comparative Sample A | 2.55 | 0.84 | 10.0 |

While considerably lower than the maximum allowable value for partial discharge, the PD level of the second lamination bus bar is nearly twice the value of that exhibited by the reactive hot-melt adhesive bonded bus bar described in Sample 4.

EXAMPLE 3

An evaluation of drop test performance of various reactive hot-melt adhesive bonded bus bars compared to second lamination bus bars was performed and the results reproduced in Table 3 below. Drop testing consists of dropping a bus bar from a height of 1.2 m upon a concrete floor. The number of "drops before delamination occurs" is recorded. It is generally required that a bus bar withstand at least 1 drop without delamination in order to be suitable for use in high performance applications. The sample bus bars were drop tested after 5 days storage at ambient conditions; after 3 weeks at 55° C. and 95% RH; and after 100 cycles from −40° C. to 105° C.

Sample 5 and Comparative sample B used pre-tooled bare copper bars, which were formed into insulated subassemblies by insulating them with Rogers Induflex® LG4005 insulation. One pair of subassemblies was laminated together using Kleiberit 708.1 polyurethane-based reactive hot-melt adhesive by the method described for Sample 1 above, to form Sample 5. A second pair of subassemblies was laminated together using the LG-4007 thermoplastic film adhesive by the second lamination method described for Comparative sample A above, to form Comparative sample B.

Another set of samples were produced, again using pre-tooled bare copper bars, but this time the conductive bars were formed into insulated subassemblies by insulating them with DuPont Melinex® 339 polyester insulation. One pair of subassemblies was laminated together using Kleiberit 708.1 polyurethane-based reactive hot-melt adhesive by the method described above for Sample 1, to form Sample 6. A second pair of subassemblies was laminated together using the LG-4007 thermoplastic adhesive film by the second lamination method described above for Comparative sample A, to form Comparative sample C.

The results for the drop test performance of each bus bar after temperature and humidity exposure and thermal cycling are shown in Table 3 below:

TABLE 3

| | Adhesive | Insulation | Number of drops before delamination | | |
|---|---|---|---|---|---|
| | | | 5 days ambient conditions | 3 weeks at 55° C., 95% RH | 100 cycles from −40° C. to 105° C. |
| Sample 5 | Kleiberit 708.1 | LG-4005 | 5 | 7 | 5 |
| Sample 6 | Kleiberit 708.1 | Melinex 339 | 10 | 10 | 5 |
| Comparative Sample B | LG-4007 | LG-4005 | 0 | 1 | 1 |
| Comparative Sample C | LG-4007 | Melinex 339 | 7 | 3 | 3 |

As seen in Table 3, the drop test performance of both reactive hot-melt adhesive bonded bus bars was superior to the second lamination bus bars. While the use of DuPont Melinex 339 polyester insulation improved the drop-test performance of Comparative sample C over the transparent PET insulation counterpart, the reactive hot-melt adhesive bonded Sample 6 still outperformed the Comparative sample C.

EXAMPLE 4

Figure 7:
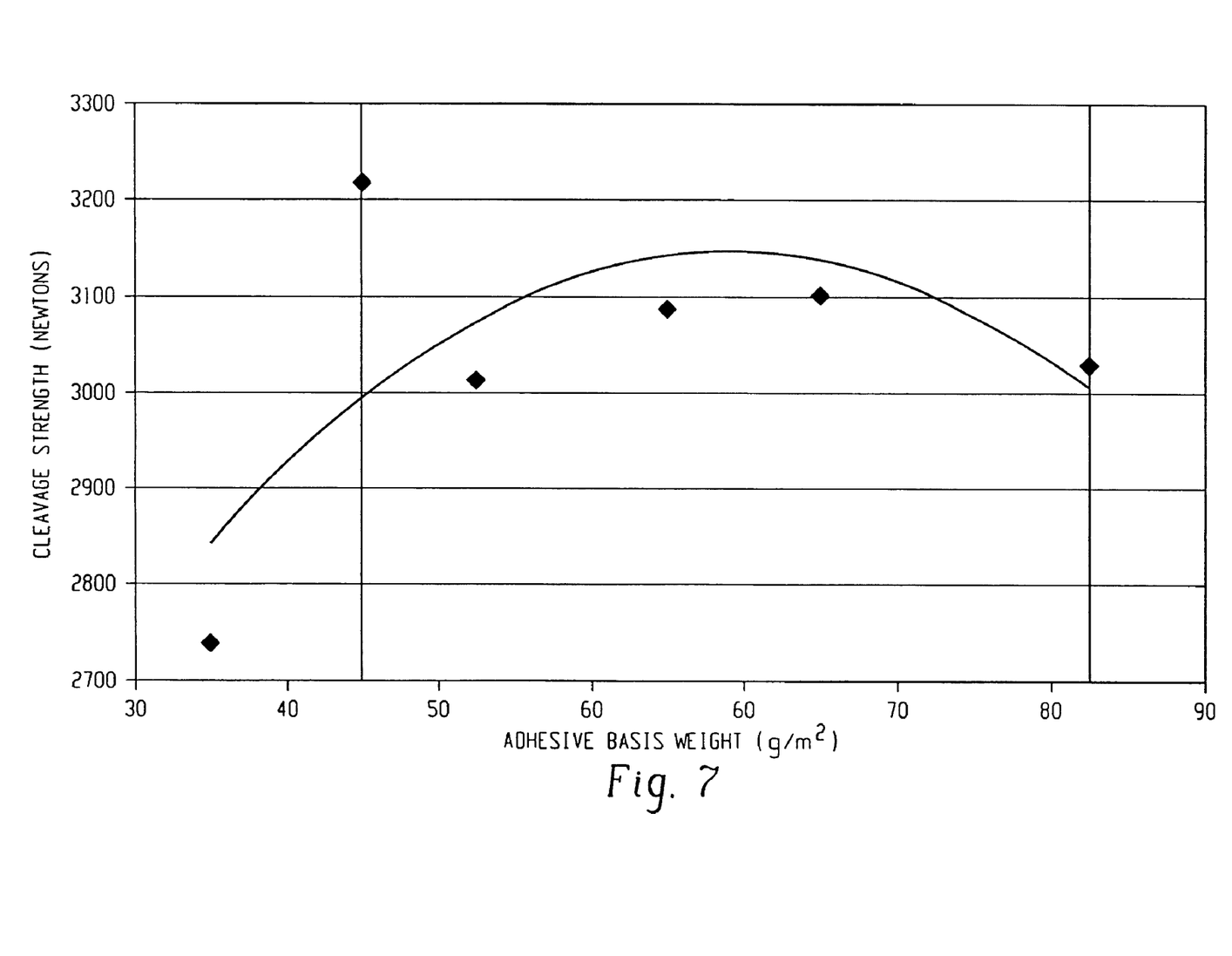
FIG. 7 is a graph representing bonding strength as a function of reactive hot-melt adhesive layer thickness.

An evaluation of adhesive layer thickness versus cleavage strength for the reactive hot-melt adhesive bonded bus bars and the results are illustrated in FIG. 7. A series of reactive hot-melt adhesive bonded bus bars were produced by the method as described for Simple 1 above, but the basis weight of the Kleiberit 708.1 polyurethane-based reactive hot-melt adhesive was varied from 35 g/m$^2$ to 94.5 g/m$^2$. The series of varying adhesive thickness bus bars were then tested for cleavage strength using ASTM D-1062. As shown in FIG. 7, cleavage strengths of greater than 3000 N are achieved when the basis weight of the reactive hot-melt adhesive layer is greater than about 45 g/m$^2$ to about 92.5 g/m$^2$. This is the optimum basis weight for the reactive hot-melt adhesive and is illustrated in FIG. 7.

The terms "first," "second," and the like as used herein do not denote any order, quantity, or importance, but rather are used to distinguish one element from another. The terms "a" and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). All ranges disclosed within this specification are inclusive of the stated endpoint, and are independently combinable. All references are incorporated herein by reference in their entirety.

While the invention has been described with reference to exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A laminated bus bar assembly, comprising:
   first and second subassemblies, each one of the subassemblies comprising a conductive element;
   a dielectric layer intermediate the first and second subassemblies; and
   a reactive hot-melt adhesive adapted to bond the first and second subassemblies to the dielectric layer, wherein the reactive hot-melt adhesive has a cleavage strength between the dielectric layer and a selected one of the first and second subassemblies of at least 1500 Newtons on a 25 millimeter by 25 millimeter sample when tested in accordance with ASTM D-1062.

2. The laminated bus bar assembly of claim 1 wherein each one of the subassemblies comprising a conductive element further comprises an insulating layer disposed about each subassembly.

3. The laminated bus bar assembly of claim 2 wherein the insulating layer comprises polyethylene terephthalate, a polyethylene terephthalate/polyvinyl fluoride, polyethylene naphthalate, polyimide, or a combination comprising at least one of the foregoing.

4. The laminated bus bar assembly of claim 1 wherein the conductive element comprises copper, tin-plated copper, aluminum, or a combination comprising at least one of the foregoing.

5. The laminated bus bar assembly of claim 1 wherein the dielectric layer comprises a flame-resistant 4 epoxy-woven glass laminate, a non-woven reinforced polyethylene terephthalate composite, a polycarbonate, a polypropylene, or a combination comprising at least one of the foregoing.

6. The laminated bus bar assembly of claim 1, wherein the reactive hot-melt adhesive has a layer thickness of about 45 grams per square meter to about 92.5 grams per square meter.

7. A method of assembling a multilayer bus bar assembly, comprising:
coating a dielectric layer with a molten reactive hot-melt adhesive;
placing the dielectric layer between and in contact with the first and second subassemblies, wherein the first and second subassemblies comprise a conductive element; and
adhering the molten reactive hot-melt adhesive to the subassemblies by applying a pressure of at least about one bar to the multilayer bus bar assembly for at least about one minute prior to the adhesive cooling to room temperature to provide a bonding strength between the dielectric material and a selected one of the first and second subassemblies of at least 1500 Newtons on a 25 millimeter by 25 millimeter sample when tested in accordance with ASTM D-1062.

8. The method of claim 7, wherein coating the dielectric layer with the molten reactive hot-melt adhesive comprises first heating the reactive hot melt adhesive in a solid form to form a molten liquid; and applying the molten liquid to the dielectric layer.

9. The method of claim 7, further comprising preheating the dielectric layer.

10. The method of claim 7, wherein curing the molten reactive hot-melt adhesive is in an absence of applied heat.

11. The method of claim 7, wherein coating the dielectric layer comprises simultaneously coating the top and bottom surfaces.

12. The method of claim 7, wherein coating the dielectric layer comprises roll coating the molten reactive hot-melt adhesive onto a top surface of the dielectric layer and providing a release layer on an exposed surface of the reactive hot melt adhesive; roll coating the molten reactive hot-melt adhesive onto a bottom surface of the dielectric layer; and removing the release layer prior to placing the dielectric layer between the first and second subassemblies.

13. The method of claim 7, wherein the coating comprises feeding the dielectric layer through a hot-melt adhesive roll coating machine.

14. The method of claim 7, wherein the reactive hot-melt adhesive is a moisture activated cross-linking adhesive.

15. The method of claim 14, wherein the moisture activated cross-linking adhesive is a polyurethane reactive hot-melt adhesive.

16. The method of claim 14, wherein the moisture activated cross-linking adhesive is an amorphous poly-alpha-olefin reactive hot-melt adhesive.

17. The method of claim 7, wherein the conductive element comprises copper, tin-plated copper, aluminum, or a combination comprising at least one of the foregoing.

18. The method of claim 7, wherein the dielectric layer comprises a flame-resistant 4 epoxy-woven glass laminate, a non-woven reinforced polyethylene terephthalate composite, a polycarbonate, a polypropylene, or a combination comprising at least one of the foregoing.

19. A multilayer bus bar made by the process of claim 7.

20. An electrical power distribution system employing the multilayer bus bar of claim 19.

* * * * *